US007924890B2

United States Patent
Konda

(10) Patent No.: US 7,924,890 B2
(45) Date of Patent: Apr. 12, 2011

(54) APPARATUS AND METHOD FOR INCREASING RELIABILITY OF DATA SENSITIVE TO PACKET LOSS

(75) Inventor: Praveen Konda, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 593 days.

(21) Appl. No.: 11/353,508

(22) Filed: Feb. 13, 2006

(65) Prior Publication Data

US 2007/0189327 A1    Aug. 16, 2007

(51) Int. Cl.
*H04J 3/12* (2006.01)

(52) U.S. Cl. ........ 370/526; 370/464; 370/465; 370/466; 370/528; 709/230; 709/231

(58) Field of Classification Search .................. 370/464, 370/465, 466, 526, 528; 709/230, 231
See application file for complete search history.

(56) References Cited

U.S. PATENT DOCUMENTS

| | | | |
|---|---|---|---|
| 5,010,567 A | 4/1991 | Tsushima | |
| 5,079,762 A * | 1/1992 | Tanabe | 370/418 |
| 5,438,618 A | 8/1995 | Jantzi et al. | |
| 5,638,436 A | 6/1997 | Hamilton et al. | |
| 5,689,557 A | 11/1997 | Kaplan | |
| 5,844,918 A | 12/1998 | Kato | |
| 5,856,971 A | 1/1999 | Gitlin et al. | |
| 6,141,788 A | 10/2000 | Rosenberg et al. | |
| 6,198,910 B1 | 3/2001 | Hanley | |
| 6,259,691 B1 | 7/2001 | Naudus | |
| 6,282,192 B1 | 8/2001 | Murphy et al. | |
| 6,298,057 B1 * | 10/2001 | Guy et al. | 370/389 |
| 6,300,887 B1 | 10/2001 | Le | |
| 6,307,839 B1 * | 10/2001 | Gerszberg et al. | 370/235 |
| 6,332,084 B1 | 12/2001 | Shaanan et al. | |
| 6,567,399 B1 * | 5/2003 | Schuster et al. | 370/352 |
| 6,570,849 B1 | 5/2003 | Skemer et al. | |
| 6,577,648 B1 | 6/2003 | Raisanen et al. | |
| 6,611,694 B1 | 8/2003 | Oltedal et al. | |
| 6,668,046 B1 | 12/2003 | Albal | |
| 6,675,340 B1 | 1/2004 | Hardie et al. | |
| 6,690,651 B1 | 2/2004 | Lamarque et al. | |
| 6,735,175 B1 | 5/2004 | Havens | |
| 6,775,265 B1 * | 8/2004 | Oran | 370/352 |
| 6,775,267 B1 | 8/2004 | Kung et al. | |
| 6,961,424 B1 | 11/2005 | Vialle et al. | |
| 7,167,451 B1 * | 1/2007 | Oran | 370/252 |
| 7,606,905 B1 * | 10/2009 | Atluri et al. | 709/226 |
| 2002/0007416 A1 * | 1/2002 | Putzolu | 709/231 |
| 2002/0015395 A1 | 2/2002 | Karagiannis | |
| 2002/0021700 A1 * | 2/2002 | Hata et al. | 370/395.42 |
| 2002/0064149 A1 * | 5/2002 | Elliott et al. | 370/352 |

(Continued)

OTHER PUBLICATIONS

RFC 2833, RTP Payload for DTMF Digits, Telephone Tones and Telephony Signals, Internet RFC/STD/FYI/BCP Archives, http://doc.rz.ifi.lmu.ed/rfc/rfc2822/html.

(Continued)

*Primary Examiner* — William Trost, IV
*Assistant Examiner* — Siming Liu
(74) *Attorney, Agent, or Firm* — Stolowitz Ford Cowger LLP

(57) ABSTRACT

An apparatus and method are provided which preferably increase reliability of data sensitive to packet loss. According to principles of the invention, a quality of service value may be dynamically assigned to network packets based on the contents of the network packets.

29 Claims, 3 Drawing Sheets

U.S. PATENT DOCUMENTS

| | | |
|---|---|---|
| 2002/0110112 A1 | 8/2002 | Tuomi |
| 2002/0154760 A1 | 10/2002 | Branden |
| 2003/0081546 A1* | 5/2003 | Agrawal et al. .............. 370/229 |
| 2003/0095504 A1 | 5/2003 | Ogier |
| 2004/0013242 A1* | 1/2004 | Engelke et al. ................ 379/52 |
| 2004/0027991 A1* | 2/2004 | Jang et al. .................... 370/230 |
| 2004/0068577 A1* | 4/2004 | Ruutu ........................... 709/236 |
| 2004/0101128 A1 | 5/2004 | Sauvage et al. |
| 2004/0179515 A1 | 9/2004 | Kamani et al. |
| 2005/0031097 A1* | 2/2005 | Rabenko et al. ........... 379/93.31 |
| 2005/0064899 A1* | 3/2005 | Angelopoulos et al. ... 455/556.1 |
| 2006/0083220 A1* | 4/2006 | Mekala et al. ................ 370/352 |

OTHER PUBLICATIONS

Stolowitz Ford Cowger LLP, Listing of Related Cases, Oct. 15, 2009.

RFC 2032, RTP Payoad Format for H.261 Video Streams, http://www.faqs.org/rfcs/rfc2032.html.

* cited by examiner

APPARATUS AND METHOD FOR INCREASING RELIABILITY OF DATA SENSITIVE TO PACKET LOSS

TECHNICAL FIELD

The invention relates generally to packet networks and, in particular, to an apparatus and method for increasing reliability of data sensitive to packet loss.

BACKGROUND OF THE INVENTION

Packet networks break voice, fax, and data into small samples or packets of information. Each packet has a header that identifies where the packet is going and provides information on reconstruction when the packet arrives. Packets travel independently and they can travel by different routes during a single call. Because of congestion on the packet network or failure of network processing nodes in the packet network, packets can be lost. That is, during periods of congestion, queues in network routers begin to overflow and routers are forced to drop packets. Quality of Service (QoS) allows network routers to decide which packets to drop when the queues fill up.

QoS refers to the capability of a network to provide better service to selected network traffic over various technologies, including Frame Relay, Asynchronous Transfer Mode (ATM), Ethernet and 802.1 networks, and IP-routed networks that may use any or all of these underlying technologies. The primary goal of QoS is to provide priority including dedicated bandwidth, controlled jitter and latency, and improved loss characteristics. Thus, QoS enables networks to provide better service to certain flows by either raising the priority of a flow or limiting the priority of another flow. A flow may refer to a combination of source and destination addresses, source and destination ports, and protocol. A flow may be defined more broadly as any packet from a certain application or from an incoming interface.

Compared to voice traffic, certain types of data are very sensitive to packet loss and congestion within the network. These include fax tones and modem tones used for signaling between fax machines or modems, Dual Tone Multi-Frequency (DTMF) tones, and text relay tones. In low bandwidth networks, these tones can get lost or corrupted and lead to failed modem and fax calls or missing or corrupted DTMF digits. Although much more sensitive to packet loss, packets containing these signaling tones are conventionally put in the same category as voice packets and get the same quality of service. Redundant packets can be sent to improve reliability when the probability of packet loss is high, enabling the receiving side to reconstruct the missing packets. Currently, a redundancy factor can be set in voice gateways and redundant packets are retransmitted the number of times specified by the redundancy factor. However, since the probability of packet loss is high during periods of congestion, transmitting redundant packets during periods of congestion may actually contribute to more congestion. Thus, there is a need for reducing the value of the redundancy factor while continuing to mitigate problems due to packet loss.

SUMMARY OF THE INVENTION

An apparatus and method according to principles of the invention increases reliability of data sensitive to packet loss. One embodiment of the method comprises encoding an audio signal into audio packets, converting the audio packets into network packets, identifying the contents of the network packets, determining whether the network packets contain data sensitive to packet loss, and assigning a quality of service value to the network packet based on the contents of the network packets. In another embodiment, the method comprises detecting packet loss in a received sequence of network packets, identifying the contents of the received network packets, determining whether the network packets contain data sensitive to packet loss, and sending a retransmission packet based on the contents of the network packets.

An embodiment of the apparatus of the invention comprises an encoder that encodes an audio signal into audio packets, and a processor adapted to convert the audio packets into network packets, identify the network packets that contain data sensitive to packet loss, and provide a quality of service value to the network packets based on the contents of the network packets.

BRIEF DESCRIPTION OF THE DRAWINGS

The above and other features and advantages of embodiments of the invention will become readily apparent by reference to the following detailed description when considered in conjunction with the accompanying drawings.

DETAILED DESCRIPTION

As will be apparent to those skilled in the art from the following disclosure, the invention as described herein may be embodied in many different forms and should not be construed as limited to the specific embodiments set forth herein. Rather, these embodiments are provided so that this disclosure will fully convey the principles and scope of the invention to those skilled in the art.

Figure 1:
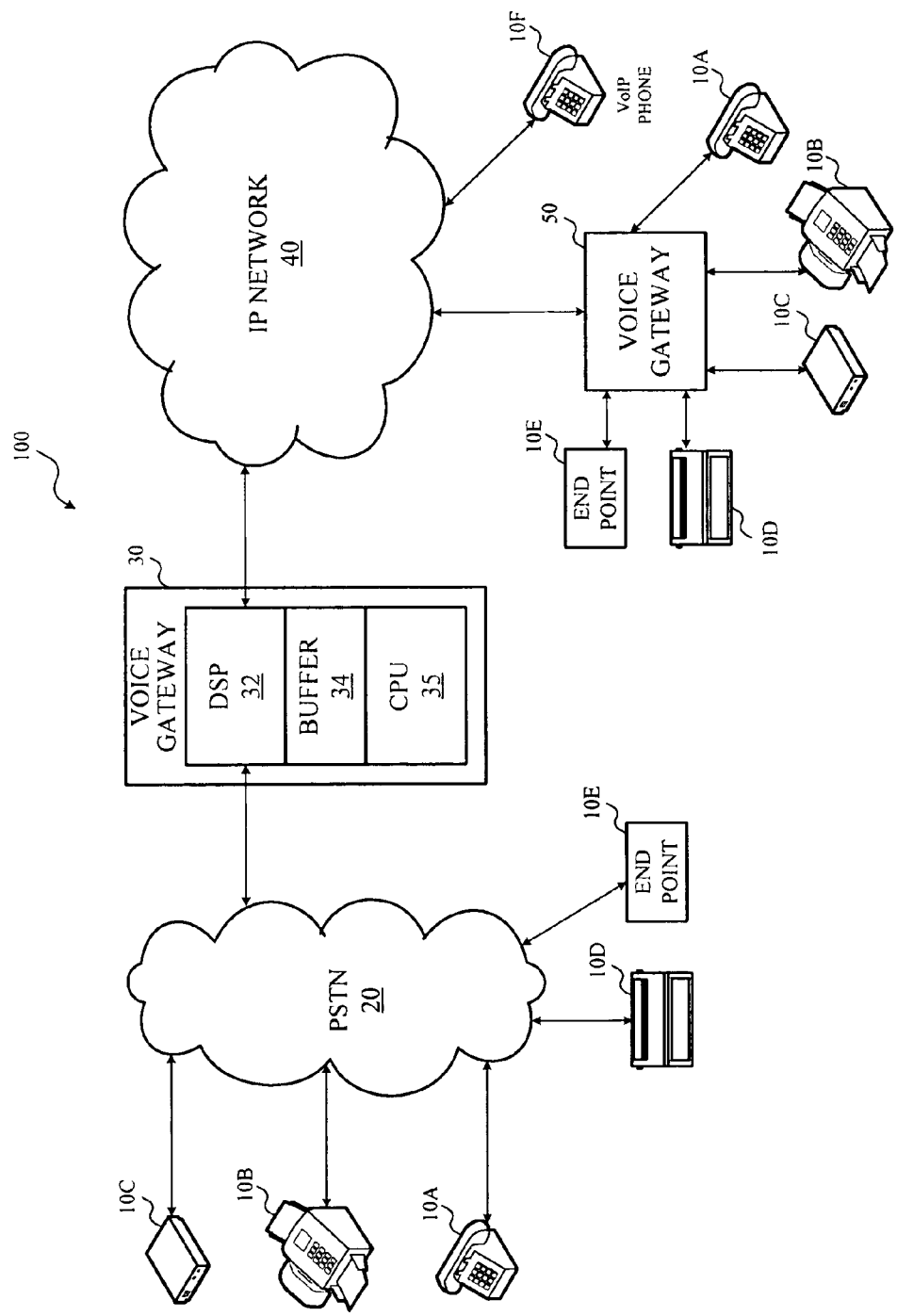
FIG. 1 is a schematic block diagram illustrating an exemplary embodiment of a communications network including gateways that increases reliability of data sensitive to packet loss according to principles of the invention.

FIG. 1 is a schematic block diagram illustrating an exemplary embodiment of a communications network 100 including gateways 30 and 50 that increase reliability of data sensitive to packet loss according to principles of the invention. The communications network 100 includes endpoints 10A-10F. Endpoints 10A-10F may be telephones, fax machines, modems, telecommunications device for the deaf (TDD) or teletypewriter (TTY) devices, and other devices used for transmitting or receiving information, particularly audio signals, over the communications network 100. A circuit-switched Public Services Telephone Network (PSTN) 20 may connect the endpoints 10A-10E with a voice gateway 30. Other endpoints 10A-10E may be connected to another voice gateway 50.

Gateway 30 and gateway 50 comprise a Digital Signal Processor (DSP) 32 that encodes and formats audio signals into Voice over Internet Protocol (VoIP) packets for routing over a packet switched network 40. The packet network 40 may be IP based, Asynchronous Transfer Mode (ATM) based, Frame Relay based, etc., leading to a variety of "Voice over" technologies including but not limited to VoIP, Voice over ATM (VoATM), Voice over Digital Subscriber Line (VoDSL), VoCable, Voice over Packet (VoP). The term "VoIP" as used herein generally refers to all of these technologies.

When one of the endpoints, such as telephone 10A, makes a VoIP call, that call usually starts out by sending audio signals from telephone 10A over the PSTN 20. The audio signals are converted by the PSTN 20 into a digital audio bit stream that is sent to voice gateway 30 over a PSTN call. DSP 32 in the gateway 30 then encodes the audio bit stream into audio packets. Other endpoints, such as endpoint 10F, can be a VoIP telephone that converts audio signals directly into VoIP packets and then sends the VoIP packets directly to the packet network 40.

A standard protocol for packetizing real-time audio for transporting VoIP is the Real-Time Transport Protocol (RTP), described in Request for Comments (RFC) 1889. To transport VoIP, the originating packet network node (for example, gateway 30) encodes the analog voice signal received from the PSTN 20, stores the encoded data in the payload of one or more data packets and transmits the data packet over the packet network 40. Each data packet includes a destination address stored in a header included in the data packet.

Gateways 30 and 50 comprise a Central Processing Unit (CPU) 35 to switch the audio packets from the DSP 32 to the output IP interface. Switching involves the following operations: receiving the audio packets from the DSP 32; decapsulating and encapsulating IP and UDP headers; forwarding the packets to the correct IP interface; link layer encapsulation; queuing the packets at that interface; and, finally, transmitting the packets.

Figure 2:
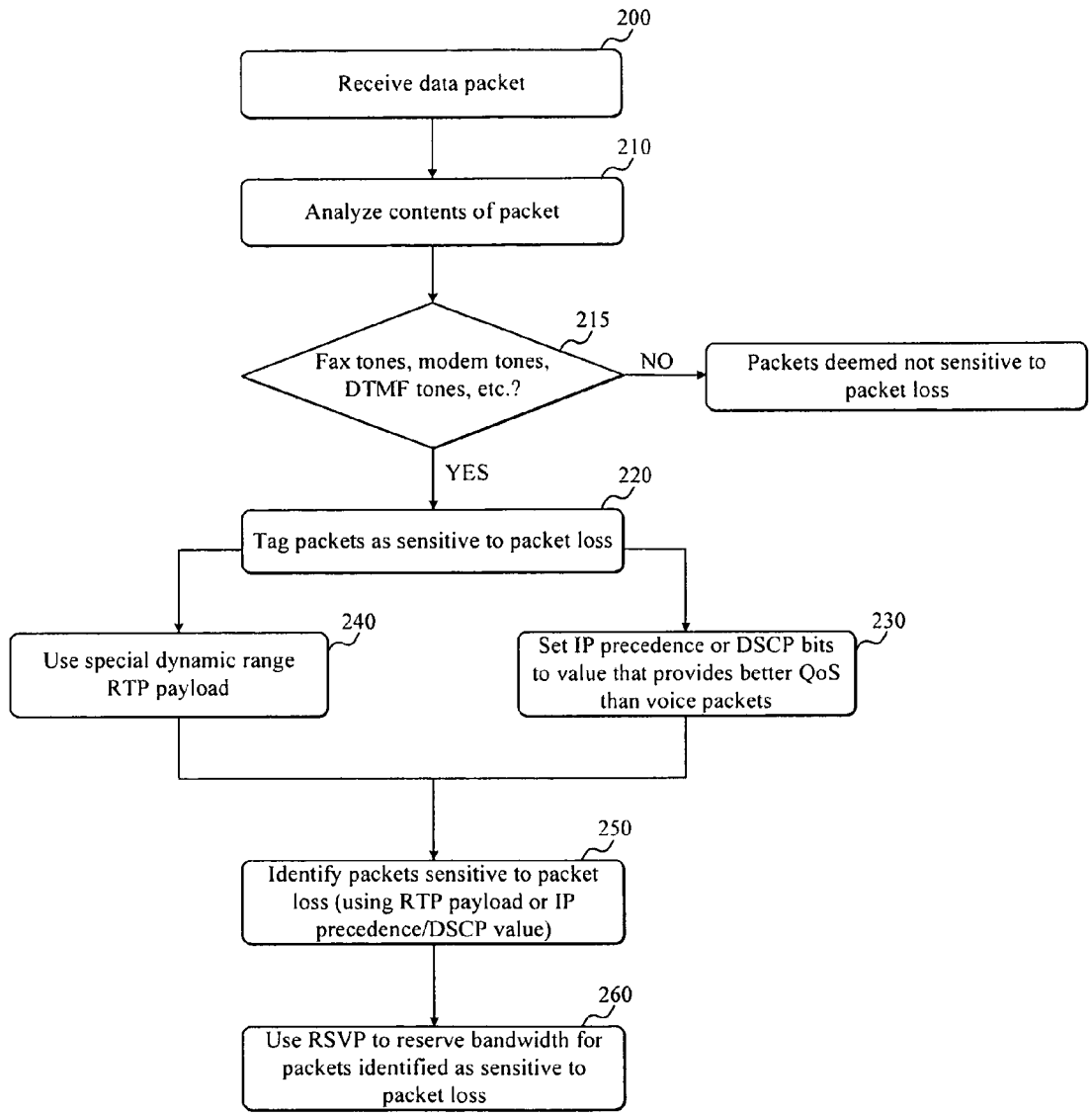
FIG. 2 is a flowchart illustrating one embodiment of a method for increasing reliability of data sensitive to packet loss.

FIG. 2 is a flowchart illustrating one embodiment of a method for increasing reliability of data sensitive to packet loss across a packet network. The method mitigates problems of packet loss in the network upfront, i.e., at the network edge, thereby reducing the need for a high redundancy factor.

Referring now to FIGS. 1 and 2, in step 200, the DSP 32 receives a data packet at an input interface of gateway 30. Conventionally, packet classification in VoIP data is done according to various rules based on physical port, source or destination IP or MAC address, application port, IP protocol type, and other criteria. A network router then determines whether to forward or drop a packet, based on criteria specified within the classification rules.

In the method of the invention, as shown in step 210, the DSP 32 in gateway 30 analyzes the contents of the packets. In step 215, the DSP 32 identifies packets that are sensitive to packet loss. These packets may include fax tones (V.21) and modem tones (V.8) used for signaling, DTMF tones, TTY tones, or other priority data. In step 220, the DSP 32 then tags the packets identified as more sensitive to packet loss.

The CPU 35 preferably receives the tagged packets from the DSP 32 and these tagged packets may then be provided a desired QoS value. In one embodiment, as shown in step 230, the CPU 35 may set the IP precedence or DSCP value of the tagged packet to a value that provides a better QoS than voice packets. The IPv4 or IPv6 header of an IP datagram has an 8-bit field called the Type of Service (ToS). Internet Protocol (RFC 791) is a standard that defines the ToS. Traditionally, IP precedence has used the first three bits of the TOS field to give 8 possible precedence values. Differentiated Services (DiffServ) is a more recent standard defined in RFC 2475, which introduces the concept of the Differentiated Service Code Point (DSCP). Both standards use the same (ToS) field in the IP packet header to identify the level of service for the packet. DSCP, however, uses the first 6 bits of the TOS field, thereby giving $2^6=64$ different values.

In one embodiment, the CPU 35 may be loaded with a computer program (software) that performs the operation of setting the IP precedence or DSCP value of the tagged packet. The computer program may be stored in a computer readable media, such as a Dynamic Random Access Memory (DRAM), Read Only Memory (ROM), Electrically Erasable Programmable Read Only Memory (EEPROM), and/or other memory devices.

In step 230, packets that have been identified as more sensitive to packet loss and tagged may then be classified to have the same QoS as signaling messages and marked with a higher precedence setting than voice packets. For example, voice packets may be assigned a default IP precedence of 5 or a DSCP value of 46. Tagged packets, those identified as more sensitive to packet loss, may then be assigned an IP precedence or a DSCP value that provides a better QoS than the voice packets, for example, an IP precedence of 3 or DSCP value of 26. Thus, using the method of the invention, the priority of individual packets can be dynamically selected based on an analysis of the packet content. In step 240, packets that conventionally receive the same QoS as voice packets can then be identified. Thus, these packets can be provided a higher level of service and redundancy factors can be reduced.

Packets identified as sensitive to packet loss may be further categorized into different levels of sensitivity and assigned different levels of priority, for example: high, medium, or low priorities by using different IP precedence or DSCP values. For example, packets containing DTMF tones may be deemed highly sensitive to packet loss; packets containing fax or modem tones may be deemed to have a medium level of sensitivity to packet loss; and packets containing TTY tones may be deemed to have a low level of sensitivity to packet loss. Thus, during periods of transmit congestion, packets sensitive to packet loss that accumulate at the outgoing interface may be scheduled for transmission according to their assigned priority and the queuing mechanism configured for the interface.

In another embodiment, as shown in step 240, a special dynamic range Real-Time Transport Protocol (RTP) payload may be used for packets that contain data sensitive to packet loss. The RTP header includes a "Payload Type" field that identifies the format of the RTP payload and determines its interpretation by the application. A profile specifies a default static mapping of payload type codes to payload formats, and additional payload type codes may be defined dynamically. For packets tagged as sensitive to packet loss, the originating gateway (for example, gateway 30) may assign an RTP payload type in the dynamic range. In step 240, these RTP packets may then be identified and distinguished from voice packets and, thus, be provided a higher QoS.

In yet another embodiment, as shown in step 260, bandwidth may be reserved specifically for packets that are sensitive to packet loss using Resource Reservation Protocol (RSVP). RSVP is an IETF standard (RFC 2205) signaling protocol for allowing an application to dynamically reserve network bandwidth, enabling the network to provide guaranteed services (usually bandwidth and latency) for the entire path of the packet. RSVP may be used to map packets that are sensitive to packet loss identified by the IP precedence or DSCP value or the RTP payload along paths to obtain the required QoS.

Figure 3:
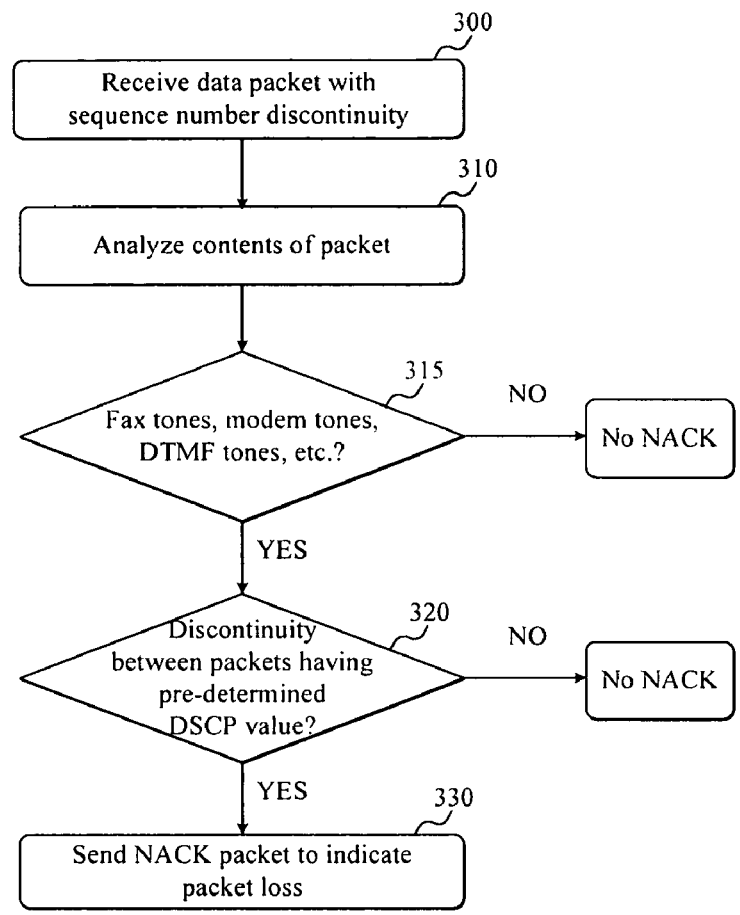
FIG. 3 is a flowchart illustrating another embodiment of a method for increasing reliability of data sensitive to packet loss.

FIG. 3 is a flowchart illustrating another embodiment of a method for increasing reliability of data sensitive to packet loss. For packet losses due to network congestion rather than transmission errors, no mechanism may be available at the sender to know if a packet has been successful received. In this embodiment, the method utilizes packet sequence numbers provided for by some transport protocols to detect packet loss at the receiver. For example, RTP and RTCP (RTP Control Protocol) add time stamps and sequence numbers to the packets, augmenting the operations of the network protocol such as IP. Essentially, the receiver (for example, gateway 50) observes the sequence numbers of packets it receives. Discontinuity (or a "hole") in the sequence number is considered indicative of a packet loss. A NACK RTCP control packet, described in RFC 2032, may be used to indicate a lost RTP packet identified by discontinuity in sequence number. One disadvantage of the NACK control packet, however, is that it may lead to increased traffic if used for all types of data. In the embodiment shown in FIG. 3, DSP 32 may be programmed such that NACK packets are preferably sent only for special types of data, like fax tones, modem tones, DTMF tones, TTY tones, etc., in case of a sequence number discontinuity between two packets having a predetermined IP precedence or DSCP value. In step 300, DSP 32 receives data packets with sequence number discontinuity indicating packet loss. In step 310, DSP 32 analyzes the contents of the packets and determines that the packets contain data sensitive to packet loss in step 315. If, in step 320, the DSP 32 determines that the sequence number discontinuity exists between two packets having a specific IP precedence or DSCP value, then, in step 330, the DSP 32 sends a NACK packet to indicate packet loss to the originating gateway. The originating gateway, for example, gateway 30, may then re-transmit the lost packet. Otherwise, no NACK packet is sent.

Referring back to the packet network of FIG. 1, each data packet transmitted may travel on a different path from a source packet network gateway to a destination packet network gateway connected to the packet network. Due to variations in the paths, data packets transmitted over the packet network may arrive out of order at the destination packet network gateway. To compensate for these path differences, each packet network gateway (30, 50) may include jitter buffers (not shown) to change the asynchronous packet arrivals into a synchronous stream by turning variable network delays into constant delays at the destination end systems (i.e., at endpoints 10A-10F). The jitter buffers temporarily store incoming data packets received from the packet network 40. After a playout delay, the data packets are delivered at a constant rate to a decoder module, where the data packets are transformed back into pulse code modulation (PCM) audio. Thus, temporarily storing the received encoded PCM data stream in a jitter buffer and adding small amounts of delay to the packets allows a smooth ordered playout of the extracted PCM data to the endpoint.

However, in an overflow, the jitter buffer is already full when another packet arrives and that next packet cannot be enqueued in the jitter buffer. To avoid lost packets due to jitter buffer overflow, a separate buffer 34 preferably may be allocated for packets identified as sensitive to packet loss.

The system described above can use dedicated processor systems, microcontrollers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software. They may also be modified in structure, content, or organization without departing from the spirit and scope of the invention.

It should be appreciated that reference throughout this specification to "one embodiment" or "an embodiment" means that a particular feature, structure, or characteristic described in connection with the embodiment may be included in at least one embodiment of the invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined or separated as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, having described exemplary embodiments of the invention, it is noted that modifications and variations can be made by persons skilled in the art in light of the above teachings. Therefore, it is to be understood that changes may be made to embodiments of the invention disclosed that are nevertheless still within the scope and the spirit of the invention.

What is claimed is:

1. A network device, comprising:
 an encoder to encode an audio signal into one or more audio packets;
 a processing system to convert the one or more audio packets into one or more network packets, identify contents of the one or more network packets, and assign a quality of service priority setting to each of the one or more network packets according to the identified contents of the one or more network packets, and when the audio signal includes signal tone data for initiating communications between endpoint devices, the processing system is configured to assign one of a plurality of high priority settings to the corresponding network packets based on a type of signal tone data included in the audio signal, wherein the processing system is configured to include the assigned high priority setting in the corresponding network packets.

2. The network device of claim 1, wherein the quality of service priority setting includes one or more bits associated with a Type of Service (ToS) field or a Differentiated Services Code Point (DSCP) field.

3. The network device of claim 1, wherein the quality of service priority setting assigned to network packets associated with the signal tone data for initiating communications between endpoint devices comprises a higher priority setting than the quality of service priority setting assigned to network packets containing voice data, and wherein the quality of service priority setting assigned to network packets associated with a fax tone, a modem tone, a TeleTYpewriter (TTY) tone, a Telecommunications Device for the Deaf (TDD) tone, or a text relay tone comprise a higher priority setting than the quality of service priority setting assigned to network packets containing voice data.

4. The network device of claim 1, wherein the signal tone data for initiating communications between endpoint devices comprises a fax tone, a modem tone, a TeleTYpewriter (TTY) tone, a Telecommunications Device for the Deaf (TDD) tone, or a text relay tone.

5. The network device of claim 1, wherein the signal tone data for initiating communications between endpoint devices comprises Dual Tone Multi-Frequency (DTMF) data, fax tone data, modem tone data, and teletypewriter (TTY) tone data, wherein the high priority setting associated with the Dual Tone Multi-Frequency (DTMF) data is larger than the high priority setting associated with the fax tone data, the modem tone data, and the teletypewriter (TTY) tone data, and wherein the high priority setting associated with the fax tone data and the modem tone data is larger than the high priority setting associated with the teletypewriter (TTY) tone data.

6. A network device, comprising:
means for encoding an audio signal into audio packets;
means for converting the audio packets into network packets;
means for identifying contents of the network packets; and
means for assigning a quality of service priority value to each of the network packets based on the identified contents, when the audio signal includes signal tone data for initiating communications between endpoint devices, the means for assigning is configured to assign one of a plurality of high priority values to the corresponding network packets based on a type of signal tone data included in the audio signal, wherein the means for assigning is configured to include the assigned high priority values in the corresponding network packets.

7. The network device of claim 6, wherein the quality of service priority value assigned to network packets associated with the signal tone data for initiating communications between endpoint devices comprises a higher priority value than the quality of service priority value assigned to network packets containing voice data.

8. The network device of claim 6, wherein the means for assigning the quality of service priority value comprises means for changing one or more bits in a network packet header.

9. The network device of claim 8, wherein the one or more bits are within one of a Type of Service (ToS) field or a Differentiated Services Code Point (DSCP) field.

10. The network device of claim 6, wherein the means for converting the audio packets comprises means for packetizing the audio packets using a Real-Time Transport Protocol (RTP).

11. The network device of claim 10, further comprising:
means for assigning a dynamic range payload type to the RTP packets containing data sensitive to packet loss.

12. The network device of claim 7, further comprising:
means for reserving bandwidth for the network packets having the higher priority value.

13. The network device of claim 6, wherein the signal tone data for initiating communications between endpoint devices comprises a fax tone, a modem tone, a TeleTYpewriter (TTY) tone, a Telecommunications Device for the Deaf (TDD) tone, or a text relay tone.

14. The network device of claim 6, wherein the signal tone data for initiating communications between endpoint devices comprises Dual Tone Multi-Frequency (DTMF) data, fax tone data, modem tone data, and teletypewriter (TTY) tone data, wherein the high priority setting associated with the Dual Tone Multi-Frequency (DTMF) data is larger than the high priority setting associated with the fax tone data, the modem tone data, and the teletypewriter (TTY) tone data, and wherein the high priority setting associated with the fax tone data and the modem tone data is larger than the high priority setting associated with the teletypewriter (TTY) tone data.

15. A network device, comprising:
means for receiving network packets over a network, wherein the network packets include corresponding priority settings, wherein the priority settings have corresponding values that are based on whether the received network packets include at least a portion of a signaling tone utilized to establish a communication session between endpoint devices and based on which type of signaling tone is included in the received network packets;
means for analyzing the priority settings included in the received network packets to determine whether the received network packets are sensitive to packet loss, wherein network packets that are sensitive to packet loss include at least a portion of a signaling tone utilized to establish communication sessions between endpoint devices;
means for jitter buffering the network packets received over the network; and
means for storing one or more of the received network packets that are determined to be sensitive to packet loss based on the priority settings when the means for jitter buffering is full and unable to store the received network packets.

16. A computer-readable memory including instructions configured to cause at least one device to:
encode an audio signal into audio packets;
convert the audio packets into network packets;
identify contents of a network packet; and
assign a quality of service priority value to each of the network packets according to the identified contents, when the audio signal includes signal tone data for initiating communications between endpoint devices, the at least one device is configured to assign one of a plurality of high priority values to the corresponding network packets based on a type of signal tone data present in the audio signal and include the assigned high priority values in the corresponding network packets.

17. The computer-readable medium of claim 16, wherein the instructions are further configured to:
determine whether the network packet contains data sensitive to packet loss; and
tag the network packet if it is determined to contain data sensitive to packet loss.

18. The computer-readable medium of claim 16, wherein the instructions are further configured to change one or more bits in a network packet header to assign the quality of service priority value, and wherein the one or more bits are within one of a Type of Service (ToS) field or a Differentiated Services Code Point (DSCP) field.

19. The computer-readable medium of claim 16, wherein the instructions are further configured to packetize the audio packets using a Real-Time Transport Protocol (RTP) to convert the audio packets, and wherein the instructions are further configured to assign a dynamic range payload type to the RTP packets containing data sensitive to packet loss.

20. The computer-readable medium of claim 17, wherein the instructions are further configured to:
reserve bandwidth for the tagged network packet.

21. The computer-readable memory of claim 16, wherein the quality of service priority value assigned to network packets associated with the fax tone device, the modem tone device, the TeleTYpewriter (TTY), the Telecommunications Device for the Deaf (TDD), or the text relay tone device comprises a higher priority value than the quality of service priority value assigned to network packets containing voice data.

22. The computer-readable memory of claim 16, wherein the instructions are further configured to reserve bandwidth for the network packets having a high priority value.

23. The computer-readable memory of claim 22, wherein reserving bandwidth comprises using Resource Reservation Protocol (RSVP).

24. The computer-readable medium of claim 23, wherein the endpoint devices further comprise a Dual Tone Multi-Frequency (DTMF) device, wherein the signal tone data for initiating communications between endpoint devices comprises Dual Tone Multi-Frequency (DTMF) data, fax tone data, modem tone data, and teletypewriter (TTY) tone data, wherein the high priority setting associated with the Dual Tone Multi-Frequency (DTMF) data is larger than the high priority setting associated with the fax tone data, the modem tone data, and the teletypewriter (TTY) tone data, and wherein the high priority setting associated with the fax tone data and the modem tone data is larger than the high priority setting associated with the teletypewriter (TTY) tone data.

25. A computer-readable memory including instructions configured to cause at least one device to:
receive network packets over a network, wherein the network packets include corresponding priority settings, wherein the priority settings have corresponding values that are based on whether the received network packets include at least a portion of a signaling tone utilized to establish a communication session between endpoint devices and based on which type of signaling tone is included in the received network packets;
determine whether at least one of the received network packets is sensitive to packet loss based on the priority settings included in the received network packets, wherein network packets that are sensitive to packet loss include at least a portion of a signaling tone utilized for initiating communications between endpoint devices;
store the network packets received over the network in a jitter buffer; and
when the jitter buffer is full and unable to store the received network packets, store one or more of the received network packets that are determined to be sensitive to packet loss based on the priority settings in a different buffer.

26. A network device, comprising:
a processor adapted to convert an audio signal into network packets, identify contents of the network packets, and assign a quality of service priority value to each of the network packets according to the identified contents of the network packets, when the audio signal includes signaling data for initiating communications between endpoint devices, the processor is configured to assign one of a plurality of high priority values and insert the assigned high priority values in the corresponding network packets based on a type of signaling data present in the audio signal.

27. The network device of claim 26, wherein the signaling data for initiating communications between endpoint devices comprises a fax tone, a modem tone, a Dual Tone Multi-Frequency (DTMF) tone, a TeleTYpewriter (TTY) tone, a Telecommunications Device for the Deaf (TDD) tone, or a text relay tone.

28. The network device of claim 26, wherein the quality of service priority value assigned to the network packets associated with the signaling data for initiating communications between endpoint devices is higher than a priority value assigned to network packets containing voice data.

29. A network device, comprising:
a processor adapted to receive network packets over a network, wherein the network packets include corresponding priority settings, wherein the priority settings have corresponding values that are based on whether the received network packets include at least a portion of a signaling tone utilized to establish a communication session between endpoint devices and based on which type of signaling tone is included in the received network packets, and wherein the processor is configured to determine whether at least one of the received network packets is sensitive to packet loss based on the priority settings included in the received network packets, wherein network packets that are sensitive to packet loss include at least a portion of a signaling tone utilized for initiating communications between endpoint devices;
a jitter buffer configured to store one or more of the network packets received over the network; and
a buffer allocated to store the received network packets that are determined to be sensitive to packet loss based on the priority settings when the jitter buffer is full and unable to store the received network packets.

* * * * *